US012307043B2

(12) United States Patent
Yin et al.

(10) Patent No.: US 12,307,043 B2
(45) Date of Patent: May 20, 2025

(54) TOUCH DISPLAY PANEL

(71) Applicant: Wuhan China Star Optoelectronics Technology Co., Ltd., Hubei (CN)

(72) Inventors: Weihong Yin, Hubei (CN); Xindong Mei, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 18/289,036

(22) PCT Filed: Jun. 30, 2023

(86) PCT No.: PCT/CN2023/104670
§ 371 (c)(1),
(2) Date: Oct. 31, 2023

(87) PCT Pub. No.: WO2024/060774
PCT Pub. Date: Mar. 28, 2024

(65) Prior Publication Data
US 2025/0085802 A1     Mar. 13, 2025

(30) Foreign Application Priority Data

Sep. 21, 2022   (CN) .......................... 202211153573.9

(51) Int. Cl.
*G09G 3/3225*     (2016.01)
*G02F 1/1333*     (2006.01)
(Continued)

(52) U.S. Cl.
CPC ........ *G06F 3/04164* (2019.05); *G06F 3/0412* (2013.01)

(58) Field of Classification Search
CPC .......................... G06F 3/04164; G06F 3/0412
See application file for complete search history.

(56) References Cited

U.S. PATENT DOCUMENTS

| 2019/0227660 | A1* | 7/2019 | Mugiraneza | ........ G02F 1/13338 |
| 2023/0326394 | A1* | 10/2023 | Lou | .......................... G09G 3/20 |
| | | | | 345/55 |
| 2024/0135870 | A1* | 4/2024 | Shin | ..................... G09G 3/3225 |

FOREIGN PATENT DOCUMENTS

| CN | 104950496 | 9/2015 |
| CN | 104951142 | 9/2015 |

(Continued)

OTHER PUBLICATIONS

International Search Report and the Written Opinion Dated Aug. 17, 2023 From the International Searching Authority Re. Application No. PCT/CN2023/104670 and Its Translation Into English. (15 Pages).

*Primary Examiner* — Lin Li

(57) ABSTRACT

A touch display panel includes a plurality of touch driving lines located in a display region, a plurality of common signal lines located in a display region, a plurality of multiplex electrodes located in the display region, and a plurality of multiplex circuits located in the display region. The multiplex circuit includes a first input end, a second input end, and a first output end. The first input end is connected to a corresponding one of the touch driving lines. The second input end is connected to a corresponding one of the common signal lines. The first output end is connected to a corresponding one of the multiplex electrodes.

20 Claims, 7 Drawing Sheets

(51) Int. Cl.
*G06F 3/041* (2006.01)
*G09G 3/20* (2006.01)

(56) References Cited

FOREIGN PATENT DOCUMENTS

| CN | 106066739 | A | * | 11/2016 | ........... G06F 3/0412 |
| CN | 107807485 | | | 3/2018 | |
| CN | 107992229 | | | 5/2018 | |
| CN | 112181202 | A | * | 1/2021 | ........... G06F 3/0412 |
| CN | 115576444 | | | 1/2023 | |

* cited by examiner

TOUCH DISPLAY PANEL

RELATED APPLICATIONS

This application is a National Phase of PCT Patent Application No. PCT/CN2023/104670 having International filing date of Jun. 30, 2023, which claims the benefit of priority of China Patent Application No. 202211153573.9 filed on Sep. 21, 2022. The contents of the above applications are all incorporated by reference as if fully set forth herein in their entirety.

FIELD OF INVENTION

The present application relates to a field of display technologies, especially to a touch display panel.

BACKGROUND OF INVENTION

A narrow frame display screen, with its simplicity, elegance, and high screen ratio, has become one of the development trends in high-end display screens. Currently, narrow frame technology development has approached a bottleneck, making it increasingly difficult to further reduce the frame of the display panel and improve product specifications. In a lower frame of the display panel, one crucial factor that cannot be ignored is a height of a fanout region, which becomes a constraint on achieving a narrow frame display screen.

SUMMARY OF INVENTION

An embodiment of the present application provides a touch display panel to solve a technical issue of an excessive height of a fanout part in a frame of the conventional touch display panel resulting in a width of the frame unable to be further reduced.

The embodiment of the present application provides a touch display panel, comprising a display region, wherein the touch display panel comprises:
  a plurality of touch driving lines distributed parallelly in the display region;
  a plurality of common signal lines distributed parallelly in the display region;
  a plurality of multiplex electrodes distributed in an array in the display region; and
  a plurality of multiplex circuits distributed in an array in the display region, wherein the multiplex circuits comprises a first input end, a second input end, and a first output end; wherein the first input end is connected to a corresponding one of the touch driving lines, the second input end is connected to a corresponding one of the common signal lines, and the first output end is connected to a corresponding one of the multiplex electrodes.

In some embodiments of the present application, the multiplex circuits are distributed in an array along a first direction and a second direction, and the touch driving lines extends along the second direction; and the second direction serves as a column direction, and the first input ends of adjacent two columns of the multiplex circuits are connected to the same one of the touch driving lines.

In some embodiments of the present application, the touch display panel further comprises:
  a plurality of first multiplex signal lines distributed parallelly in the display region;
  a plurality of second multiplex signal lines distributed parallelly in the display region;
  a plurality of third multiplex signal lines distributed parallelly in the display region; and
  a plurality of fourth multiplex signal lines distributed parallelly in the display region;
  wherein each of the multiplex circuits further comprises a first control end and a second control end, wherein the first control end is connected to a corresponding one of the first multiplex signal lines or the second multiplex signal lines, and the second control end is connected to a corresponding one of the third multiplex signal lines or the fourth multiplex signal lines.

In some embodiments of the present application, in two columns of the multiplex circuits connected to the same one of the touch driving lines, the first control ends of one column of the multiplex circuits are connected to the first multiplex signal lines, the first control ends of the other column of the multiplex circuits are connected to the second multiplex signal lines; the second control ends of one column of the multiplex circuits are connected to the third multiplex signal lines, the second control ends of the other column of the multiplex circuits are connected to the fourth multiplex signal lines.

In some embodiments of the present application, the first multiplex signal lines, the second multiplex signal lines, the third multiplex signal lines and the fourth multiplex signal lines extend along the first direction, and the touch driving lines and the common signal lines extend along the second direction.

In some embodiments of the present application, in two columns of the multiplex circuits connected to the same one of the touch driving lines, and one of the common signal lines connected to one column of the multiplex circuits and another of the common signal lines connected to the other column of the multiplex circuits are distributed symmetrically relative to the touch driving lines.

In some embodiments of the present application, the touch display panel further comprises a plurality of touch lead lines distributed parallelly in the display region, the touch lead lines are electrically connected to the multiplex circuits and the multiplex electrodes, and the touch lead lines extend along the second direction, and in two columns of the multiplex circuits connected to the same one of the touch driving lines, one of the touch lead lines connected to one column of the multiplex circuits and another of the touch lead lines connected to the other column of the multiplex circuits are distributed symmetrically relative to the touch driving lines.

In some embodiments of the present application, in the common signal lines, the touch lead lines, and the touch driving lines connected to the same one of the multiplex circuits, the touch lead lines are nearer the touch driving lines relative to the common signal lines.

In some embodiments of the present application, each of the multiplex circuits comprises a first transistor and a second transistor electrically connected to each other, a gate electrode of the first transistor is electrically connected to the first multiplex signal lines or the second multiplex signal lines, a source electrode of the first transistor is connected to the touch driving lines, a drain electrode of the first transistor is connected to the touch lead lines, a gate electrode of the second transistor is connected to the third multiplex signal lines or the fourth multiplex signal lines, a source electrode of the second transistor is connected to the common signal lines, and a drain electrode of the second transistor is connected to the drain electrode of the first transistor.

In some embodiments of the present application, the touch display panel further comprises a plurality of scan lines extending along the first direction and arranged along the second direction, a plurality of data lines extending along the second direction and arranged along the first direction, the scan lines intersect the data lines to define a plurality of sub-pixel regions, wherein the first transistor and the second transistor in any one of the multiplex circuits are disposed in the same one or different ones of the sub-pixel regions.

In some embodiments of the present application, the touch display panel further comprises a plurality of pixel units arranged in an array, sub-pixels of the pixel unit are located in a corresponding one of the sub-pixel regions; two of the multiplex circuits sharing the same one of the touch driving lines along the first direction are a multiplex circuit set, a region in which a pixel electrode is located is defined as a repeat region, the repeat region corresponds to some of the pixel units, and a plurality of the multiplex circuit sets along the first direction and the second direction are evenly distributed in the repeat region.

In some embodiments of the present application, a region in which one of the multiplex circuit sets exists corresponds to some of the pixel units arranged in an array.

In some embodiments of the present application, in a region corresponding to the pixel electrode, a number of the multiplex circuit sets is less than a number of the sub-pixel regions.

In some embodiments of the present application, the first multiplex signal lines, the second multiplex signal lines, the third multiplex signal lines, the fourth multiplex signal lines, and the scan lines are disposed in a same layer, the first multiplex signal lines, the second multiplex signal lines, the third multiplex signal lines, and the fourth multiplex signal lines are adjacent to a corresponding one of the scan lines.

In some embodiments of the present application, the first multiplex signal lines, the second multiplex signal lines, the third multiplex signal lines, and the fourth multiplex signal lines are disposed in a layer different from a layer in which the scan lines are disposed, and along a thickness projection direction of the touch display panel, the first multiplex signal lines, the second multiplex signal lines, the third multiplex signal lines, and the fourth multiplex signal lines at least partially overlap corresponding ones of the scan lines, respectively.

In some embodiments of the present application, the common signal lines, the touch lead lines, and the touch driving lines are disposed in a layer different from a layer in which the data lines are disposed, along a thickness projection direction of the touch display panel, the common signal lines, the touch lead lines, and the touch driving lines at least partially overlap corresponding ones of the data lines.

In some embodiments of the present application, the first transistor and the second transistor comprises at least one of an amorphous silicon transistor, a metal oxide transistor, and a low-temperature polycrystalline silicon transistor.

In some embodiments of the present application, the touch display panel comprises:
  a substrate;
  a display transistor disposed on the substrate and comprising an active layer, a gate electrode, a source electrode, and a drain electrode; and
  a pixel electrode disposed on the display transistor;
  wherein the multiplex electrodes are disposed among the display transistor, the source electrode, and the drain electrode, the touch driving lines, the common signal lines, and the multiplex electrodes are disposed in a same layer.

In some embodiments of the present application, material of the multiplex electrodes comprises indium tin oxide.

In some embodiments of the present application, the display transistor is a polycrystalline transistor.

Advantages

The touch display panel provided by the embodiment of the present application comprises a plurality of touch driving lines distributed parallelly the display region, a plurality of lines distributed parallelly in the display region, a plurality of multiplex electrodes distributed in an array in the display region, and a plurality of multiplex circuits distributed in an array in the display region, the multiplex circuits comprises a first input end, a second input end, and a first output end; wherein the first input end is connected to a corresponding one of the touch driving lines, the second input end is connected to a corresponding one of the common signal lines, and the first output end is connected to a corresponding one of the multiplex electrodes. Integrating the multiplex circuits for controlling the touching component and displaying and the signal lines connected to the multiplex circuits in the display region can lower the fanout height of the lower frame, which facilitates implementation of the design of the narrow frame.

DETAILED DESCRIPTION OF PREFERRED EMBODIMENTS

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

Furthermore, terminologies "first", "second" are only for the purposes of description, and cannot be understood as indication or implication of comparative importance or a number of technical features. Therefore, a feature limited with "first", "second" can expressly or implicitly include one or more features. In the description of the present application, a meaning of "a plurality of" is two or more, unless there is a clear and specific limitation otherwise.

Figure 1:
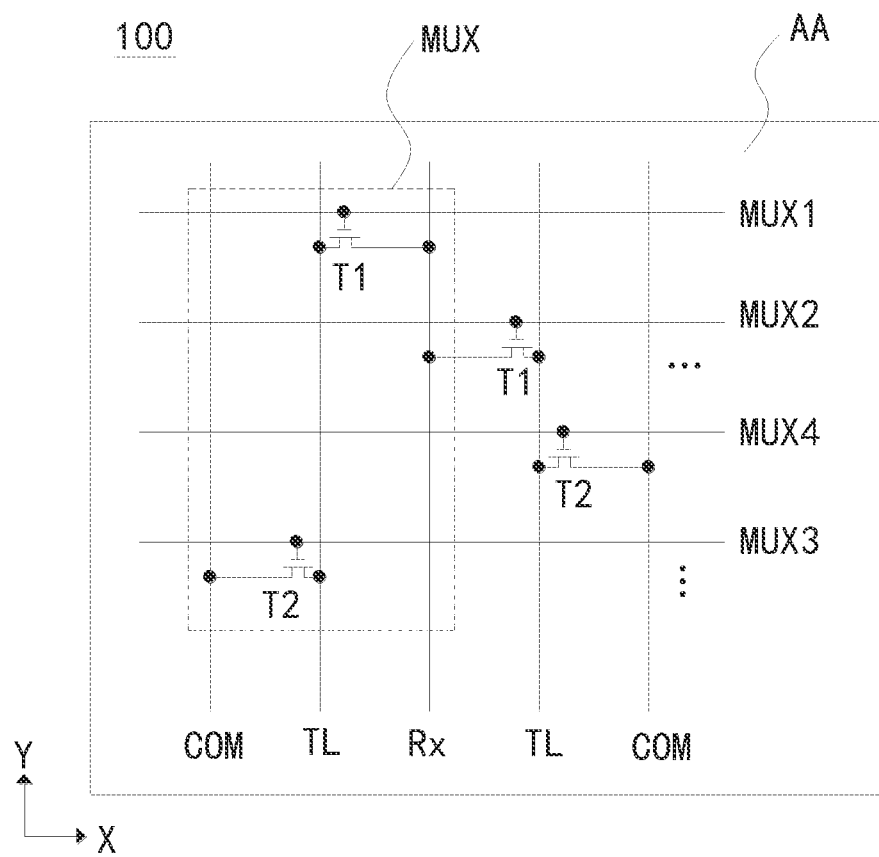
FIG. 1 is a schematic view of a layout of multiplex circuits provided by the embodiment of the present application.
Figure 2:
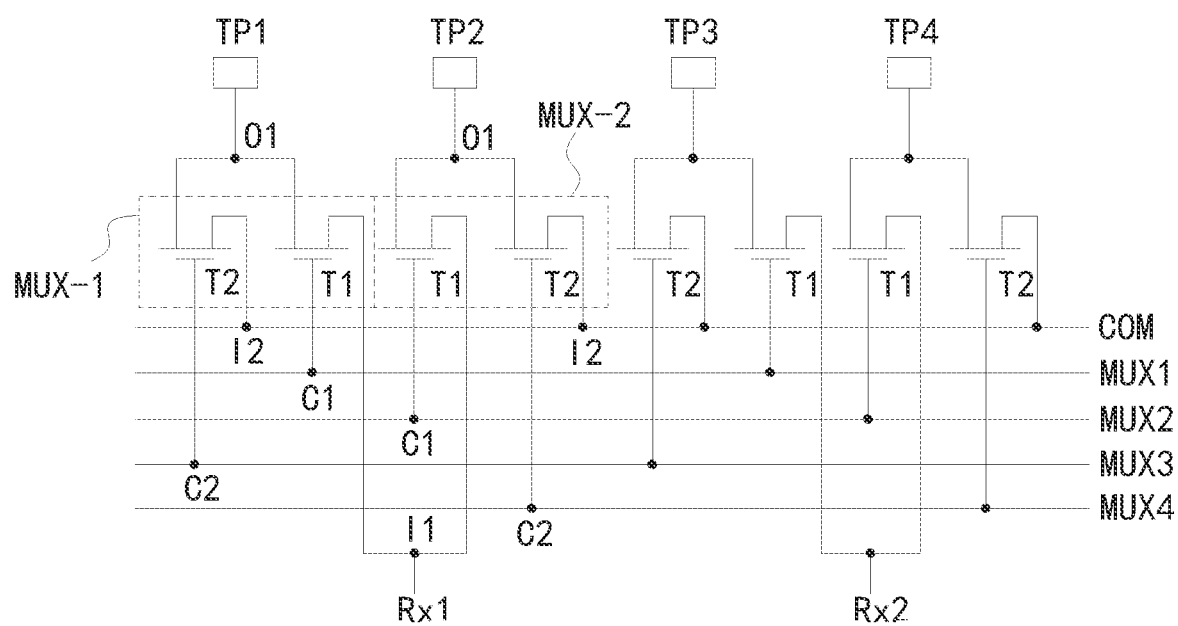
FIG. 2 is a schematic view of circuit principles of the multiplex circuits provided by the embodiment of the present application.

With reference to FIGS. 1 and 2, FIG. 1 is a schematic view of a layout of multiplex circuits integrated in a display region provided by the embodiment of the present application, FIG. 2 is a schematic view of circuit principles of the multiplex circuits provided by the embodiment of the present application. The embodiment of the present application provides a touch display panel 100, the touch display panel 100 comprises a display region AA and a non-display region (not shown in the figures). The display region AA is configured to display images. The non-display region comprises a fanout region and a bonding region. The non-display region is not configured for display. The touch display panel 100 can be a liquid crystal display panel.

The touch display panel 100 comprises a plurality of touch driving lines Rx, a plurality of common signal lines COM, a plurality of multiplex electrodes (TP1 to TP4 as shown in FIG. 2) and a plurality of multiplex circuits MUX. The touch driving lines Rx are parallelly distributed in the display region AA. The common signal lines COM are parallelly distributed in the display region AA. The multiplex circuits MUX are distributed in an array in the display region AA. The multiplex electrodes are distributed in an array in the display region. The touch driving lines Rx are configured to transmit touch driving signals. The common signal lines COM are configured to provide common voltage signals. The multiplex electrodes serve as common electrodes during display and serve as touch electrodes during touch. The multiplex circuits MUX are configured to transmit common voltage signals or touch driving signals to the multiplex electrodes.

In particular, with reference to FIG. 2, the multiplex circuits MUX comprises a first input end I1, a second input end I2, a first output end O1, a first control end C1, and a second control end C2. The first input end I1 is connected to a corresponding one of the touch driving lines Rx to receive a touch driving signal. The second input end I2 is connected to a corresponding one of the common signal lines COM to receive a common voltage signal. The first output end O1 is connected to a corresponding one of the multiplex electrodes TP to transmit a touch driving signal or a common voltage signal to the multiplex electrodes TP. The first control end C1 controls a channel between the first input end I1 and the first output end O1 to turn on and off. The second control end C2 controls a channel between the second input end I2 and the first output end O1 to turn on and off.

The conventional technology sets the touch circuit in a region of the lower frame in the non-display region and thus occupies an excessive fanout space. The embodiment of the present application employs a design of the multiplex circuits MUX for controlling the touch function, and integrates the multiplex circuits MUX in the display region AA of the touch display panel 100 without additionally occupying the lower frame space, which facilitates further optimization of the narrow frame.

With reference to FIG. 1, FIG. 1 only shows two multiplex circuits MUX for illustration. The multiplex circuits MUX can be distributed in an array along a first direction X and a second direction Y. The touch driving lines Rx extend along the second direction. In the embodiment of the present application, adjacent two columns of the multiplex circuits can commonly employ one touch driving line Rx, which can save vertical lines.

In particular, with reference to FIGS. 1 and 2 simultaneously, the first direction X serves as a row direction (horizontal direction), the second direction Y serves as column direction (vertical direction), the first input ends I1 of each adjacent two columns of the multiplex circuits MUX can be connected to the same one of the touch driving lines Rx.

Furthermore, the touch driving line Rx is disposed between adjacent two columns of the multiplex circuits MUX such that the touch driving line Rx is connected to the multiplex circuits MUX on two sides for saving wirings.

With reference to FIG. 1, the touch display panel further comprises a plurality of first multiplex signal lines MUX1 that are parallel, a plurality of second multiplex signal lines MUX2 that are parallel, a plurality of third multiplex signal lines MUX3 that are parallel, and a plurality of fourth multiplex signal lines MUX4 that are parallel. The first multiplex signal lines MUX1, the second multiplex signal lines MUX2, the third multiplex signal lines MUX3, and the fourth multiplex signal lines MUX4 are all in the display region AA.

With reference to FIG. 2, the first control end C1 of the multiplex circuit MUX is connected to a corresponding one of the first multiplex signal lines MUX1 or second multiplex signal lines MUX2. The second control end C2 of the multiplex circuit MUX is connected to a corresponding one of the third multiplex signal lines MUX3 or the fourth multiplex signal lines MUX4. Connecting the first control ends C1 and the second control ends C2 of different multiplex circuits MUX to different multiplex signal lines allows controlling the multiplex electrodes in different locations to be in a touch state or a display state at the same timing by turning on or off the multiplex circuits MUX, to transmit touch driving signals to some of the multiplex electrodes, and to transmit to common voltage signals another some of the multiplex electrodes, which prevents floating (suspending) signal resulting in abnormal display.

Furthermore, in two columns of the multiplex circuits MUX connected to the same one of the touch driving lines Rx, the first control ends C1 of one column of the multiplex circuits MUX are connected to the first multiplex signal lines MUX1, the first control ends C1 of the other column of the multiplex circuits MUX are connected to the second multiplex signal lines MUX2. The second control ends C2 of one column of the multiplex circuits MUX are connected to the third multiplex signal lines MUX3. The second control ends C2 of the other column of the multiplex circuits MUX are connected to the fourth multiplex signal lines MUX4.

Figure 7:
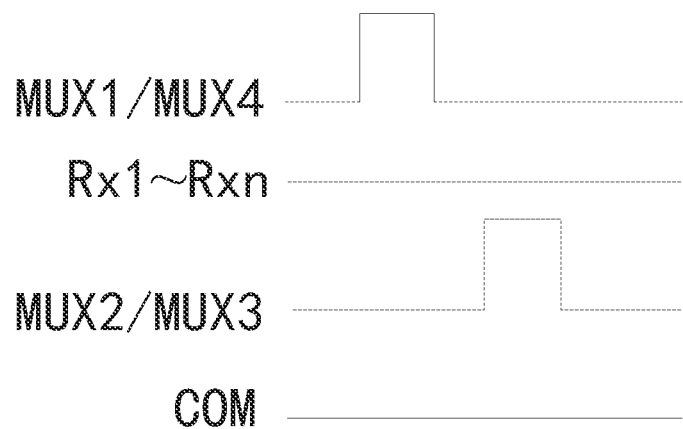
FIG. 7 is a work timing chart of a touch display panel provided by the embodiment of the present application in the timing of a frame.

For instance, in the multiplex circuit MUX-1 and the multiplex circuit MUX-2 connected to the same the touch driving lines Rx1, the first control end C1 of the multiplex circuit MUX-1 is connected to the first multiplex signal line MUX1, the first control end C1 of the multiplex circuit MUX-2 is connected to the second multiplex signal line MUX2, the second control end C2 of the multiplex circuit MUX-1 is connected to the third multiplex signal line MUX3, the second control end C2 of the multiplex circuit MUX-2 is connected to the fourth multiplex signal line MUX4. With reference to FIGS. 2 and 7, FIG. 7 is a work timing chart of a touch display panel provided by the embodiment of the present application in the timing of a frame. When first multiplex signal lines MUX1 is in a high level, a switch controlled by the first control end C1 of the multiplex circuit MUX-1 is controlled to turn on to transmit a touch driving signal to a multiplex electrode TP1 and a multiplex electrode TP3, and in the meantime, the fourth multiplex signal lines MUX4 is in a high level and a switch controlled by the second control end C2 of the multiplex circuit MUX-2 turns on to transmit a common voltage signal to a multiplex electrode TP2 and a multiplex electrode TP4. In the meantime, the second multiplex signal line MUX2 and the third multiplex signal line MUX3 are in a low level, a switch controlled by the second control end C2 of the multiplex circuit MUX-1, and a switch controlled by the first control end C1 of the multiplex circuit MUX-2 are in a turn-off state, which achieves a guarantee for the function of the common electrodes while realizing the multiplex electrodes of the embodiment of the present application. The common signal lines COM and the touch driving lines Rx1-Rxn in the embodiment of the present application are always in a constant voltage state (for example, −0.1V), −0.1V can be set., −8V can be set when each of the multiplex signal lines MUX1-MUX4 is in a low level, and 10V can be set when each of the multiplex signal lines MUX1-MUX4 is in a high level.

The multiplex electrodes TP1-TP4 in the embodiment of the present application are only for exemplary explanation, a person of ordinary skill in the art should know that the touch display panel shall include a plurality of multiplex electrodes. As described above, work timings of the exemplary multiplex electrodes TP1, TP3 are the same, and work timings of the multiplex electrodes TP2, TP4 are the same, the multiplex electrodes TP1, TP3 can be two multiplex electrodes at an interval in the same row, can be two multiplex electrodes of the same columns at an interval, and also can be two adjacent multiplex electrodes, or two adjacent multiplex electrodes of the same column. In the same timing, selection of multiplex electrodes used for the touch function and selection of multiplex electrodes used for display is not limited. Preferably, the multiplex electrodes of every other row or every other column serve as touch electrodes, and remains of the multiplex electrodes serve as display electrodes.

With reference to FIG. 1, the touch display panel 100 of the embodiment of the present application further comprises a plurality of touch lead lines TL distributed parallelly in the display region AA. The touch lead lines are electrically connected to both the multiplex circuits and the multiplex electrodes, and the touch lead lines TL extend along the second direction Y. To reduce cross line regions of multiplex circuits MUX for connection with lines, an arrangement of other signal lines relating to two columns of the multiplex circuits MUX connected to the same one of the touch driving lines Rx can be a mirror arrangement, namely, those signal lines relating to the two columns of the multiplex circuits MUX are arranged symmetrically relative to the touch driving lines Rx.

In particular, in two columns of the multiplex circuits MUX connected to the same one of the touch driving lines Rx, one of the touch lead lines TL connected to one column of the multiplex circuits MUX and another of the touch lead lines TL connected to the other column of the multiplex circuits MUX are arranged symmetrically relative to the touch driving lines Rx. One of the common signal lines COM connected to one column of the multiplex circuits MUX and another of the common signal lines COM connected to the other column of the multiplex circuits MUX are distributed symmetrically relative to the touch driving lines Rx, which can reduce the cross line regions maximally.

Furthermore, in the common signal lines COM and the touch lead lines TL connected to the same one of the multiplex circuits MUX, the touch lead lines TL are nearer the touch driving lines Rx relative to the common signal lines COM. Namely, using a layout of the mirror arrangement of COM, TL, Rx, TL, COM can save vertical lines and reduce cross lines maximally.

With reference to FIGS. 1 and 2, each of the multiplex circuits MUX comprises a first transistor T1 and a second transistor T2 electrically connected to each other. A gate electrode of the first transistor T1 is electrically connected to the first multiplex signal line MUX1 or the second multiplex signal line MUX2. A source electrode of the first transistor T1 is connected to the touch driving line Rx1. A drain electrode of the first transistor T1 is connected to the touch lead line TL. A gate electrode of the second transistor is connected to the third multiplex signal line MUX3 or the fourth multiplex signal line MUX4. A source electrode of the second transistor is connected to the common signal line COM. A drain electrode of the second transistor T2 is connected to the drain electrode of the first transistor T1. Namely, the gate electrode of the first transistor T1 corresponds to the first control end C1, the source electrode of the first transistor T1 corresponds to the first input end I1, the gate electrode of the second transistor T2 corresponds to the second control end C2, and the source electrode of the second transistor corresponds to the second input end I2. Also, the drain electrode of the first transistor T1 and the drain electrode of the second transistor T2 correspond to the first output end O1.

The transistors mentioned by the embodiment of the present application are thin film transistors, and specifically can be at least one of amorphous silicon thin film transistors, metal oxide transistors, and low-temperature polycrystalline silicon transistors, and no limit thereto is here.

With reference to FIG. 1, in the embodiment of the present application, the first multiplex signal lines MUX1, the second multiplex signal lines MUX2, the third multiplex signal lines MUX3, and the fourth multiplex signal lines MUX4 extend along the first direction X, namely, are arranged along a horizontal direction. An arrangement sequence of the first multiplex signal lines MUX1, the second multiplex signal lines MUX2, the third multiplex signal lines MUX3, and the fourth multiplex signal lines MUX4 is adjusted according to distribution locations of the transistors of the multiplex circuits MUX to reduce cross lines. In a specific embodiment, the first multiplex signal lines MUX1, the second multiplex signal lines MUX2, the fourth multiplex signal lines MUX4, and the third multiplex signal lines MUX3 are sequentially arranged along the second direction Y. The first multiplex signal lines MUX1, the second multiplex signal lines MUX2, the fourth multiplex signal lines MUX4, and the third multiplex signal lines MUX3 mutually intersect the common signal lines COM, the touch lead lines TL, the touch driving lines Rx, the touch lead lines TL, and the common signal lines COM extending along the second direction and sequentially arranged to form a region of 4×4 units. The first transistors T1 of the multiplex circuits MUX on a side of the touch driving lines Rx are located on a location of 1-2 (first row and second column), the second transistors T2 of the multiplex circuits MUX are located on a location of 4-1 (fourth row and first column). The first transistor T1 of the multiplex circuits MUX on another side of the touch driving lines Rx are located on a location of 2-3 (second row and third column), and second transistor T2 of the multiplex circuits MUX are located on a location of 4-1 (third row and fourth column). In other embodiment, the multiplex circuits MUX can be designed according to sizes and amount of the multiplex electrodes, distribution locations of the transistors of the multiplex circuits MUX have no limit.

Figure 3:
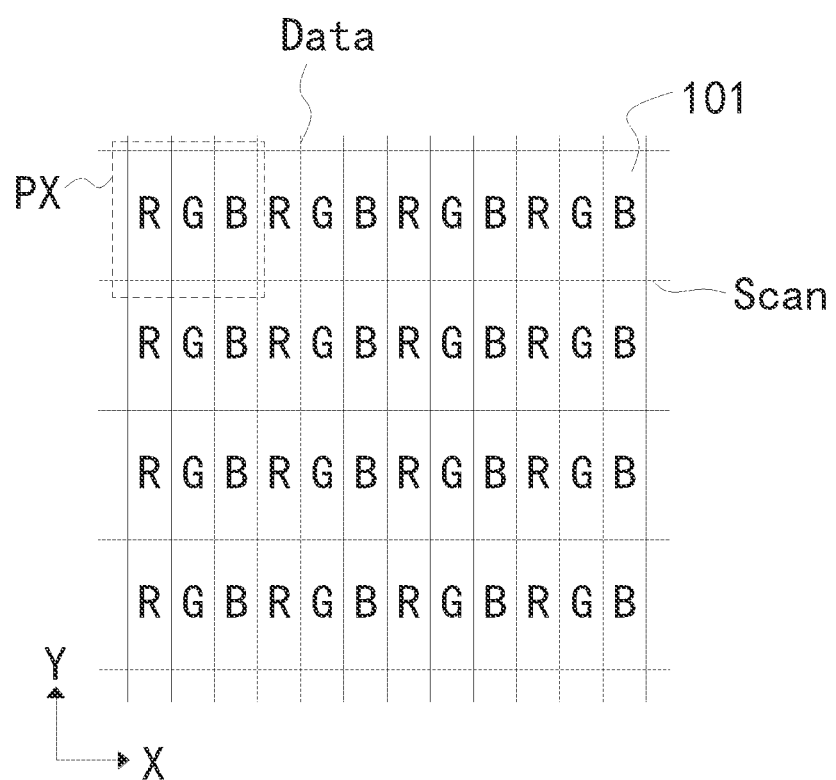
FIG. 3 is a schematic view of a layout of sub-pixels provided by the embodiment of the present application.

With reference to FIG. 3, the touch display panel 100 of the embodiment of the present application comprises a plurality of scan lines Scan and a plurality of data lines Data. The scan lines Scan and the data lines Data mutually intersect one another to define a plurality of sub-pixel regions 101. The touch display panel comprises a plurality of pixel units arranged in an array. The pixel unit comprises several sub-pixels. The sub-pixels are located in a corresponding one of the sub-pixel regions 101. Each of the sub-pixel regions 101 corresponds to one of the sub-pixels, for example, red sub-pixel R, green sub-pixel G, blue sub-pixel B etc. Adjacent red sub-pixel R, green sub-pixel G, and blue sub-pixel B form a pixel unit PX. The first transistor T1 and the second transistor T2 of any one of the multiplex circuits MUX can be disposed in the same or different sub-pixel regions 101. In a specific embodiment of the present application, the first transistor T1 and the second transistor T2 are located in different sub-pixel regions 101, as shown in FIG. 4.

In particular, the scan lines Scan extend along the first direction X and are arranged along the second direction Y, and the data lines Data extend along the second direction Y and are arranged along the first direction X, in order not to occupy aperture regions of the sub-pixels as much as possible, along a thickness projection direction of the display panel, multiplex signal lines MUX1-MUX4 extending along the first direction X the embodiment of the present application are near corresponding ones of the scan lines Scan as much as possible, and the common signal lines COM, the touch lead lines TL, the touch driving lines Rx extending along the second direction Y are near corresponding ones of the data lines Data as much as possible.

Figure 4:
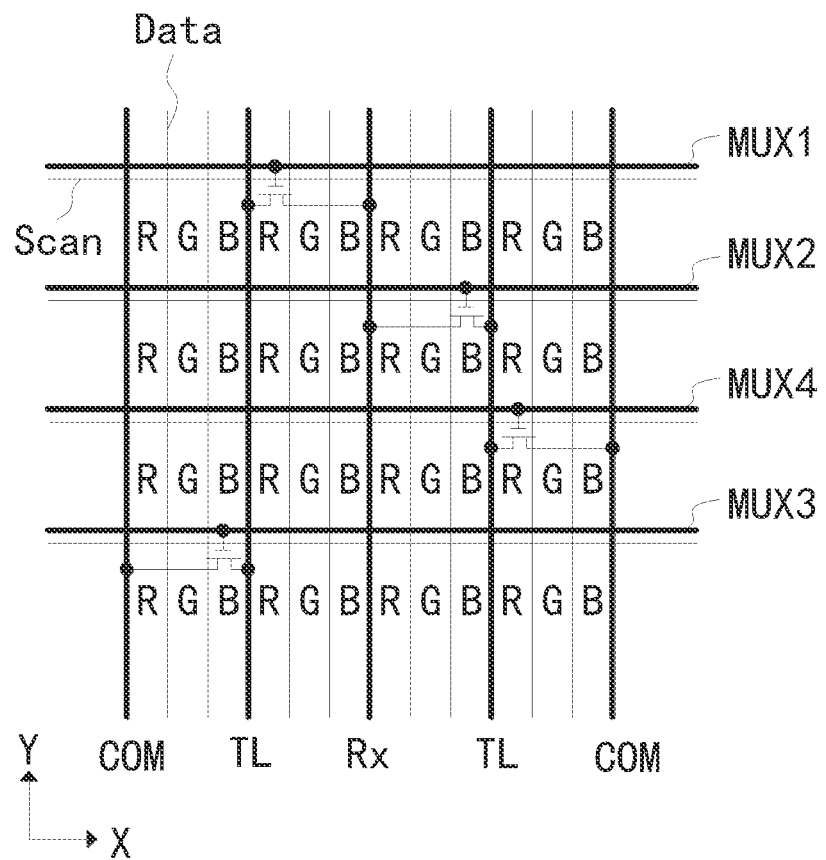
FIG. 4 is a schematic view of a layout of another multiplex circuits provided by the embodiment of the present application.

With reference to FIG. 4, in the embodiment of the present application, the first multiplex signal lines MUX1, the second multiplex signal lines MUX2, the third multiplex signal lines MUX3, the fourth multiplex signal lines MUX4, and the scan lines Scan are disposed in the same layer. The first multiplex signal lines MUX1, the second multiplex signal lines MUX2, the third multiplex signal lines MUX3 and the fourth multiplex signal lines MUX4 are located adjacent to a corresponding one of the scan lines Scan, respectively. Namely, the first multiplex signal lines MUX1, the second multiplex signal lines MUX2, the third multiplex signal lines MUX3, and the fourth multiplex signal lines MUX4 are adjacent to display transistors of corresponding ones of the scan lines to lower influence to the pixel aperture rate as much as possible. In other embodiment, when the multiplex signal lines and scan lines are disposed in different layers, in a thickness projection direction of the touch display panel, the first multiplex signal lines MUX1, the second multiplex signal lines MUX2, the third multiplex signal lines MUX3, and the fourth multiplex signal lines MUX4 at least partially overlap corresponding ones of the scan lines Scan, respectively. Preferably, in the thickness projection direction of the touch display panel, the first multiplex signal lines MUX1, the second multiplex signal lines MUX2, the third multiplex signal lines MUX3, and the fourth multiplex signal lines MUX4 coincide with corresponding ones of the scan lines Scan, respectively.

In the embodiment of the present application, the common signal lines COM, the touch lead lines TL, and the touch driving lines are disposed in a layer different from a layer in which the data lines Data are disposed. In the thickness projection direction of the touch display panel 100, the common signal lines COM, the touch lead lines TL, and the touch driving lines Rx at least partially overlap corresponding ones of the data lines Data. Preferably, in the thickness projection direction of the touch display panel 100, the common signal lines COM, the touch lead lines TL, and the touch driving lines coincide with corresponding ones of the data lines to reduce influence of a pixel aperture rate to as much as possible.

Two of the multiplex circuits MUX commonly sharing the same one of the touch driving lines Rx along the first direction X is a multiplex circuit set. A region in which one pixel electrode TP is located is a repeat region, one repeat region corresponds to a plurality of sub-pixel regions, a plurality of multiplex circuit sets are distributed evenly in the repeat region along the first direction X and the second direction Y. Namely, a plurality of multiplex circuit sets are arranged evenly in a plurality of sub-pixel regions along the first direction and the second direction.

In a region corresponding to one pixel electrode TP, a number of the multiplex circuit sets is less than a number of the sub-pixel regions. A region in which one multiplex circuit set is located corresponds to several pixel units arranged in an array.

In particular, with reference to FIG. 4, in the embodiment of the present application, a number of pixel units PX occupied by a multiplex circuit set formed by adjacent two of the multiplex circuits MUX along the first direction X is 4×4, namely, a number of the occupied sub-pixel regions 101 is 12×4, signal lines (for example, the touch lead lines TL, the common signal lines COM, the touch driving lines Rx, multiplex signal lines, etc.) connected to the two sets of the multiplex circuits coincide with corresponding ones of the scan lines Scan or the data lines Data as much as possible.

Figure 5:
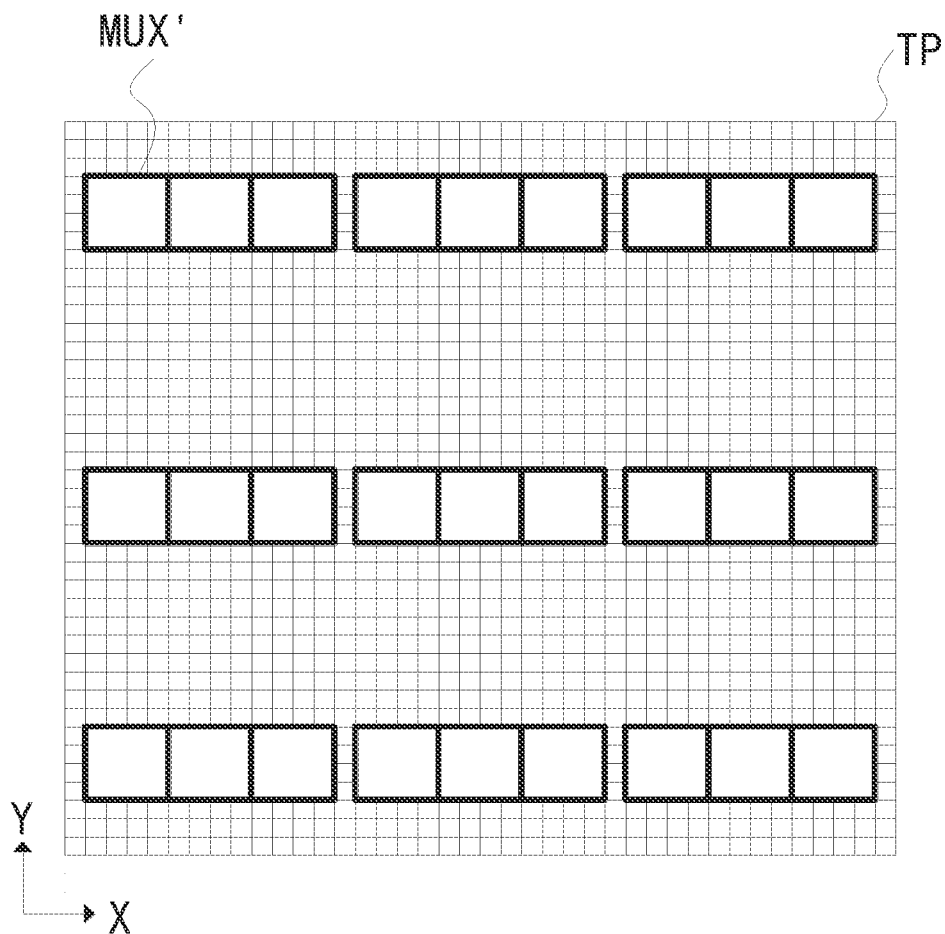
FIG. 5 is a schematic view of a layout of another multiplex circuits provided by the embodiment of the present application.

For instance, with reference to FIG. 5, in FIG. 5, a lattice of one minimal unit corresponds to one pixel unit PX, and one multiplex electrode TP of the embodiment of the present application can correspond to pixel units PX of 40×40 rows and columns, a set of the pixel units PX of 4×4 rows and columns (bolded 4×4 rows and columns in FIG. 5) corresponds to one multiplex circuit set MUX'. For example, the pixel units PX in one set of 4×4 rows and columns correspond to the multiplex circuit MUX-1 and MUX-2. Two multiplex circuits MUX commonly sharing the touch driving line Rx along the first direction X is a multiplex circuit set MUX'. For example, the multiplex circuit MUX-1 and MUX-2 are a multiplex circuit set MUX'. In a plurality of sub-pixel regions corresponding to a size of one multiplex electrode TP, the multiplex circuit sets MUX' are distributed evenly along the first direction X and the second direction Y respectively. For instance, along the first direction, every three multiplex circuit sets MUX' are arranged continuously, every three multiplex circuit sets MUX' are disposed with an interval of a column of the sub-pixel regions. Along the second direction, adjacent two of the multiplex circuit sets MUX' are arranged at an interval of ten columns of the sub-pixel regions.

Figure 6:
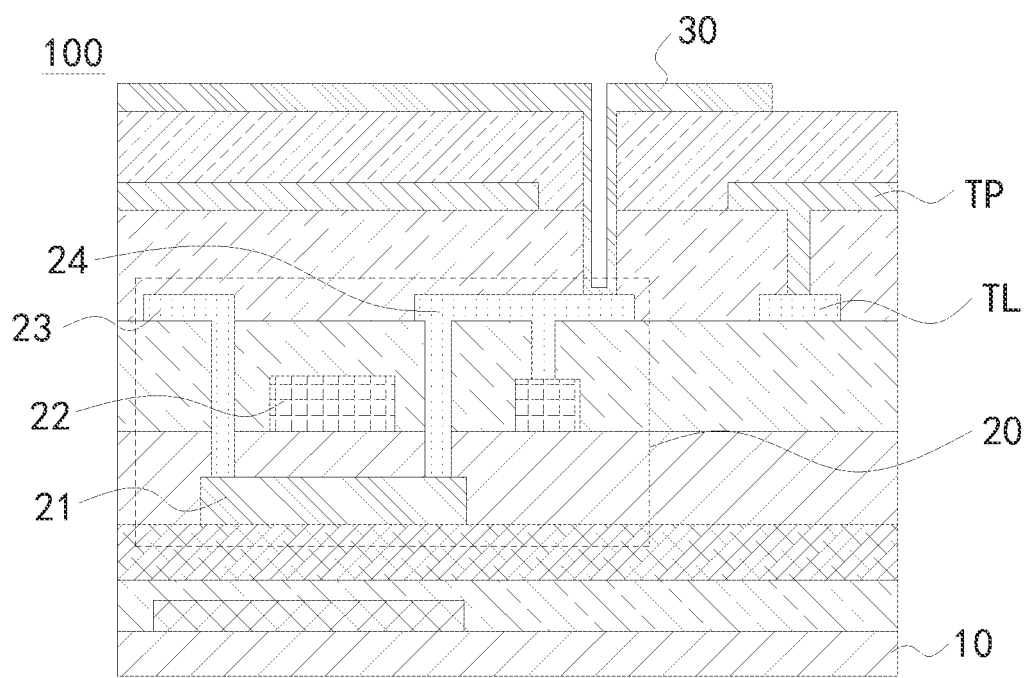
FIG. 6 is a schematic view of a film layer stacking configuration of a touch display panel provided by the embodiment of the present application.

With reference to FIG. 6, the touch display panel 100 of the embodiment of the present application comprises a substrate 10, a display transistor 20 disposed on the substrate 10, a pixel electrode 30 disposed on the display transistor 20, a liquid crystal layer on the pixel electrode, and a color filter substrate (not shown in the figures) on the liquid crystal layer. The pixel electrode 30 is electrically connected to the display transistor 20. The display transistor 20 comprises an active layer 21, a gate electrode 22, a source electrode 23, and a drain electrode 24. The multiplex electrodes TP can be disposed between the pixel electrode 30 and a source electrode 23/a drain electrode 24. The touch lead lines TL and the source electrode 23/the drain electrode 24 can be disposed in the same layer. The common signal lines COM, the touch driving lines Rx, and the multiplex electrodes TP can be disposed in the same layer.

"Disposed in the same layer" mentioned by the embodiment of the present application refers to formation by the same material and the same patterning process. Material of the multiplex electrodes TP comprises but is not limited to indium tin oxide. The display transistor 20 can be a polycrystalline transistor.

As described above, the embodiment of the present application provides a touch display panel, comprising a plurality of touch driving lines distributed parallelly the display region, a plurality of common signal lines distributed parallelly in the display region, a plurality of multiplex electrodes distributed in an array in the display region, and a plurality of multiplex circuits distributed in an array in the display region, the multiplex circuits comprises a first input end, a second input end, and a first output end; wherein the first input end is connected to a corresponding one of the touch driving lines, the second input end is connected to a corresponding one of the common signal lines, and the first output end is connected to a corresponding one of the multiplex electrodes. Integrating the multiplex circuits for controlling the touching component and displaying and the signal lines connected to the multiplex circuits in the display region can lower the fanout height of the lower frame, which facilitates implementation of the design of the narrow frame.

In the above-mentioned embodiments, the descriptions of the various embodiments are focused. For the details of the embodiments not described, reference may be made to the related descriptions of the other embodiments.

The touch display panel provided by the embodiment of the present application is described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments or equivalently replace some of the technical features. These modifications or replacements do not make the essence of the technical solutions depart from a range of the technical solutions of the embodiments of the present application.

The display panel provided by the embodiment of the present application is described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments or equivalently replace some of the technical features. These modifications or replacements do not make the essence of the technical solutions depart from a range of the technical solutions of the embodiments of the present application.

What is claimed is:

1. A touch display panel, comprising a display region, wherein the touch display panel comprises:
   a plurality of touch driving lines distributed parallelly in the display region;
   a plurality of common signal lines distributed parallelly in the display region;
   a plurality of multiplex electrodes distributed in an array in the display region; and
   a plurality of multiplex circuits distributed in an array in the display region, wherein the multiplex circuits comprises a first input end, a second input end, and a first output end; wherein the first input end is connected to a corresponding one of the touch driving lines, the second input end is connected to a corresponding one of the common signal lines, and the first output end is connected to a corresponding one of the multiplex electrodes.

2. The touch display panel according to claim 1, wherein the multiplex circuits are distributed in an array along a first direction and a second direction, and the touch driving lines extends along the second direction; and
   the second direction serves as a column direction, and the first input ends of adjacent two columns of the multiplex circuits are connected to the same one of the touch driving lines.

3. The touch display panel according to claim 2, wherein the touch display panel further comprises:
   a plurality of first multiplex signal lines distributed parallelly in the display region;
   a plurality of second multiplex signal lines distributed parallelly in the display region;
   a plurality of third multiplex signal lines distributed parallelly in the display region; and
   a plurality of fourth multiplex signal lines distributed parallelly in the display region;
   wherein each of the multiplex circuits further comprises a first control end and a second control end, wherein the first control end is connected to a corresponding one of the first multiplex signal lines or the second multiplex signal lines, and the second control end is connected to a corresponding one of the third multiplex signal lines or the fourth multiplex signal lines.

4. The touch display panel according to claim 3, wherein in two columns of the multiplex circuits connected to the same one of the touch driving lines, the first control ends of one column of the multiplex circuits are connected to the first multiplex signal lines, the first control ends of the other column of the multiplex circuits are connected to the second multiplex signal lines; the second control ends of one column of the multiplex circuits are connected to the third multiplex signal lines, the second control ends of the other column of the multiplex circuits are connected to the fourth multiplex signal lines.

5. The touch display panel according to claim 4, wherein the first multiplex signal lines, the second multiplex signal lines, the third multiplex signal lines and the fourth multiplex signal lines extend along the first direction, and the touch driving lines and the common signal lines extend along the second direction.

6. The touch display panel according to claim 5, wherein in two columns of the multiplex circuits connected to the same one of the touch driving lines, and one of the common signal lines connected to one column of the multiplex circuits and another of the common signal lines connected to the other column of the multiplex circuits are distributed symmetrically relative to the touch driving lines.

7. The touch display panel according to claim 5, wherein the touch display panel further comprises a plurality of touch lead lines distributed parallelly in the display region, the touch lead lines are electrically connected to the multiplex circuits and the multiplex electrodes, and the touch lead lines extend along the second direction, and
   in two columns of the multiplex circuits connected to the same one of the touch driving lines, one of the touch lead lines connected to one column of the multiplex circuits and another of the touch lead lines connected to the other column of the multiplex circuits are distributed symmetrically relative to the touch driving lines.

8. The touch display panel according to claim 7, wherein in the common signal lines, the touch lead lines, and the touch driving lines connected to the same one of the multiplex circuits, the touch lead lines are nearer the touch driving lines relative to the common signal lines.

9. The touch display panel according to claim 7, wherein each of the multiplex circuits comprises a first transistor and a second transistor electrically connected to each other, a gate electrode of the first transistor is electrically connected to the first multiplex signal lines or the second multiplex signal lines, a source electrode of the first transistor is connected to the touch driving lines, a drain electrode of the first transistor is connected to the touch lead lines, a gate electrode of the second transistor is connected to the third multiplex signal lines or the fourth multiplex signal lines, a source electrode of the second transistor is connected to the common signal lines, and a drain electrode of the second transistor is connected to the drain electrode of the first transistor.

10. The touch display panel according to claim 9, wherein the touch display panel further comprises a plurality of scan lines extending along the first direction and arranged along the second direction, a plurality of data lines extending along the second direction and arranged along the first direction, the scan lines intersect the data lines to define a plurality of sub-pixel regions, wherein the first transistor and the second transistor in any one of the multiplex circuits are disposed in the same one or different ones of the sub-pixel regions.

11. The touch display panel according to claim 10, wherein the touch display panel further comprises a plurality of pixel units arranged in an array, sub-pixels of the pixel unit are located in a corresponding one of the sub-pixel regions; two of the multiplex circuits sharing the same one of the touch driving lines along the first direction are a multiplex circuit set, a region in which a pixel electrode is located is defined as a repeat region, the repeat region corresponds to some of the pixel units, and a plurality of the multiplex circuit sets along the first direction and the second direction are evenly distributed in the repeat region.

12. The touch display panel according to claim 11, wherein a region in which one of the multiplex circuit sets exists corresponds to some of the pixel units arranged in an array.

13. The touch display panel according to claim 11, wherein in a region corresponding to the pixel electrode, a number of the multiplex circuit sets is less than a number of the sub-pixel regions.

14. The touch display panel according to claim 10, wherein the first multiplex signal lines, the second multiplex signal lines, the third multiplex signal lines, the fourth multiplex signal lines, and the scan lines are disposed in a same layer, the first multiplex signal lines, the second multiplex signal lines, the third multiplex signal lines, and the fourth multiplex signal lines are adjacent to a corresponding one of the scan lines.

15. The touch display panel according to claim 10, wherein the first multiplex signal lines, the second multiplex signal lines, the third multiplex signal lines, and the fourth multiplex signal lines are disposed in a layer different from a layer in which the scan lines are disposed, and along a thickness projection direction of the touch display panel, the first multiplex signal lines, the second multiplex signal lines, the third multiplex signal lines, and the fourth multiplex signal lines at least partially overlap corresponding ones of the scan lines, respectively.

16. The touch display panel according to claim 10, wherein the common signal lines, the touch lead lines, and the touch driving lines are disposed in a layer different from a layer in which the data lines are disposed, along a thickness projection direction of the touch display panel, the common signal lines, the touch lead lines, and the touch driving lines at least partially overlap corresponding ones of the data lines.

17. The touch display panel according to claim 9, wherein the first transistor and the second transistor comprises at least one of an amorphous silicon transistor, a metal oxide transistor, and a low-temperature polycrystalline silicon transistor.

18. The touch display panel according to claim 1, wherein the touch display panel comprises:
a substrate;
a display transistor disposed on the substrate and comprising an active layer, a gate electrode, a source electrode, and a drain electrode; and
a pixel electrode disposed on the display transistor;
wherein the multiplex electrodes are disposed among the display transistor, the source electrode, and the drain electrode, the touch driving lines, the common signal lines, and the multiplex electrodes are disposed in a same layer.

19. The touch display panel according to claim 18, wherein material of the multiplex electrodes comprises indium tin oxide.

20. The touch display panel according to claim 18, wherein the display transistor is a polycrystalline transistor.

* * * * *